(12) United States Patent
Hausler et al.

(10) Patent No.: US 8,863,580 B2
(45) Date of Patent: Oct. 21, 2014

(54) PROCESS FLUID PRESSURE TRANSMITTER WITH REPLACEABLE ATMOSPHERIC VENT FILTER

(75) Inventors: George Charles Hausler, Maple Grove, MN (US); Nicholas Haywood, Brooklyn Park, MN (US); Daniel Ronald Schwartz, Hopkins, MN (US)

(73) Assignee: Rosemount Inc., Eden Prairie, MN (US)

( * ) Notice: Subject to any disclaimer, the term of this patent is extended or adjusted under 35 U.S.C. 154(b) by 742 days.

(21) Appl. No.: 13/101,593

(22) Filed: May 5, 2011

(65) Prior Publication Data

US 2012/0279580 A1     Nov. 8, 2012

(51) Int. Cl.
*G01L 19/06* (2006.01)

(52) U.S. Cl.
CPC .................................. *G01L 19/0636* (2013.01)
USPC ............................. 73/706; 210/449

(58) Field of Classification Search
CPC .................... G01L 19/0636; G01L 19/0645
USPC .......... 73/706, 718; 361/283.4; 210/435, 446, 210/449
See application file for complete search history.

(56) References Cited

U.S. PATENT DOCUMENTS

| 2,068,837 | A | * | 1/1937 | Aronson ........................ 210/446 |
| 3,090,490 | A | * | 5/1963 | Yocum ........................... 210/446 |
| 3,121,685 | A | * | 2/1964 | Hazell ........................... 210/446 |
| 3,386,585 | A | * | 6/1968 | Weyand et al. ................ 210/446 |
| 4,414,851 | A | * | 11/1983 | Maglic ........................ 361/283.3 |
| 4,425,799 | A | * | 1/1984 | Park ................................ 73/718 |
| 4,617,607 | A | * | 10/1986 | Park et al. .................... 361/283.4 |
| 4,970,898 | A | * | 11/1990 | Walish et al. .................... 73/706 |
| 5,315,877 | A | | 5/1994 | Park et al. ........................ 73/724 |
| 5,747,694 | A | * | 5/1998 | Baba et al. ....................... 73/723 |
| 5,796,008 | A | * | 8/1998 | Stoll et al. ....................... 73/740 |
| 5,895,859 | A | * | 4/1999 | Sawada et al. ................... 73/706 |
| 6,050,145 | A | * | 4/2000 | Olson et al. ..................... 73/706 |
| 6,422,085 | B1 | * | 7/2002 | Hegner et al. ................... 73/706 |
| 6,945,120 | B1 | * | 9/2005 | Marcus et al. ................... 73/756 |
| 8,485,040 | B2 | * | 7/2013 | Petersen ......................... 73/706 |
| 2001/0029786 | A1 | * | 10/2001 | Takakuwa et al. ............. 73/706 |
| 2004/0079148 | A1 | * | 4/2004 | Sandford et al. ............... 73/756 |

FOREIGN PATENT DOCUMENTS

| CN | 2821553 Y | 9/2006 |
| CN | 2854545 Y | 1/2007 |
| GB | 2286460 | 8/1995 |

OTHER PUBLICATIONS

Product Data Sheet: Rosemount 2090F Hygienic Pressure Transmitter. Apr. 2010 by Emerson Process Management.
International Search Report and Written Opinion from International application No. PCT/US2012/033436 dated Jul. 2, 2012.
First Office Action from Chinese Application No. CN201210061756.8, dated Mar. 5, 2014.

* cited by examiner

*Primary Examiner* — John Rivell
(74) *Attorney, Agent, or Firm* — Westman, Champlin & Koehler, P.A.

(57) ABSTRACT

A process fluid pressure transmitter for measuring a process pressure referenced to atmospheric pressure is provided. The process fluid pressure transmitter includes a pressure sensor fluidically coupled to a pair of pressure conveying conduits. The pressure sensor has an electrical characteristic that varies with the pressures applied by the pressure conveying conduits. A process fluid inlet is disposed to contact a process fluid, and is in fluidic communication with a first conduit of the pair of pressure conveying conduits. An atmospheric vent is coupled to a second conduit of the pair of pressure conveying conduits. The atmospheric vent is replaceable and has a filter element disposed therein.

16 Claims, 6 Drawing Sheets

PROCESS FLUID PRESSURE TRANSMITTER WITH REPLACEABLE ATMOSPHERIC VENT FILTER

BACKGROUND

Process fluid pressure transmitters are commonly used in industrial processes to measure and monitor pressures of various industrial process fluids, such as slurries, liquids, vapors and gases of chemical, pulp, petroleum, gas, pharmaceuticals, food and other fluid-type processing plants.

Gage pressure sensors generally include a process fluid pressure input which is operably coupled to a pressure sensor within the transmitter. An atmospheric vent line is coupled to the pressure sensor, such that the differential pressure sensor readout is the difference between the process fluid pressure and atmospheric pressure.

In some sanitary measurement applications, the outside of the process fluid pressure transmitter is exposed to a variety of food products and/or chemicals. These devices are generally cleaned using caustic solutions, scrub brushes, and high pressure sprayers. Thus, the design of process fluid pressure transmitters for use in sanitary insulations must ensure that the transmitter will withstand the various caustic chemicals and other substances to which it will be exposed, as well as the high pressure spray used to clean it. Moreover, the thermal shock of the spray itself must also be well tolerated.

SUMMARY

A process fluid pressure transmitter for measuring a process pressure referenced to atmospheric pressure is provided. The process fluid pressure transmitter includes a pressure sensor fluidically coupled to a pair of pressure conveying conduits. The pressure sensor has an electrical characteristic that varies with the pressures applied by the pressure conveying conduits. A process fluid inlet is disposed to contact a process fluid, and is in fluidic communication with a first conduit of the pair of pressure conveying conduits. An atmospheric vent is coupled to a second conduit of the pair of pressure conveying conduits. The atmospheric vent is replaceable and has a filter element disposed therein.

DETAILED DESCRIPTION OF ILLUSTRATIVE EMBODIMENTS

Process fluid pressure measurement transmitters that require an atmospheric pressure measurement must have a filter system between the sensor and the outside atmosphere that prevents contaminants from either plugging the measurement passageway or reaching the pressure sensor. In sanitary measurement applications, the outside of the transmitter is exposed to various substances, such as food products, chemicals, and cleaners. In such situations, the filter element needs to be protected from contact and must be able to handle the high pressure cleanings and scrubbings. In accordance with an embodiment of the present invention, a replaceable atmospheric vent filter is provided.

Figure 1:
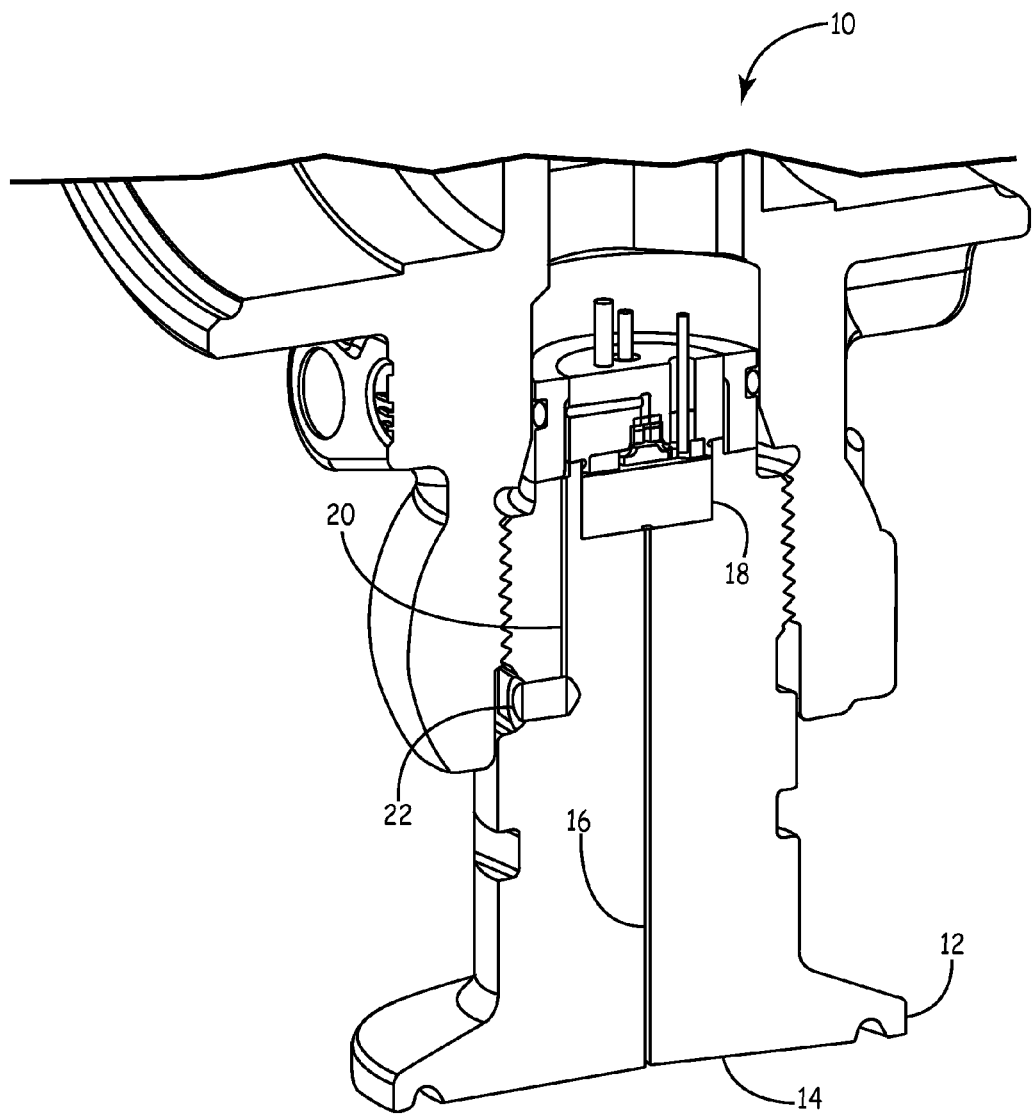
FIG. 1 is a partial cutaway view of a process fluid gage pressure transmitter employing a PTFE atmospheric vent filter in accordance with the prior art.

FIG. 1 is a diagrammatic view of a sanitary process fluid pressure transmitter in accordance with the prior art. Transmitter 10 includes a base 12 which is mounted, or otherwise affixed to a process fluid container, such as a pipe or tank. Process fluid pressure acts against isolator diaphragm 14 and causes movement of isolator diaphragm 14 which, in turn, creates a corresponding pressure within sensing passageway 16. Passageway 16 conveys the process fluid pressure to pressures sensor 18. Pressure sensor 18 has an electrical property, such as capacitance or resistance that varies in response to the deflection of a small sensing diaphragm therein. An opposite side of the sensing diaphragm is coupled to atmospheric pressure via vent passageway 20. As vent passageway couples to the ambient environment, a PTFE filter 22 is permanently affixed within base 12. One problem with the design illustrated in FIG. 1 is that if the filter 22 becomes clogged, or otherwise damaged, the entire process fluid pressure transmitter must be taken offline and repaired.

Figure 2:
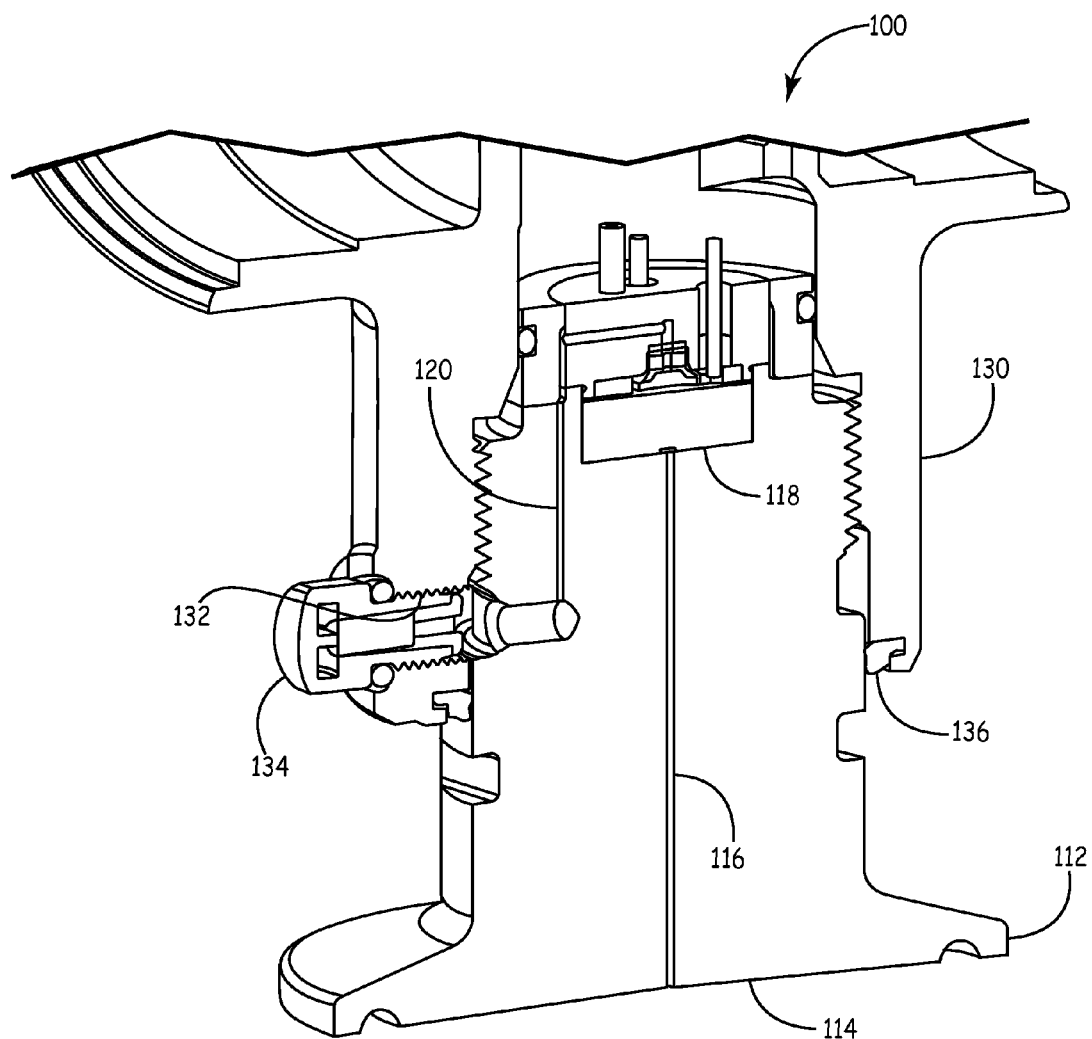
FIG. 2 is a partial cutaway view of a process fluid gage pressure transmitter employing a replaceable PTFE filter in accordance with an embodiment of the present invention.

FIG. 2 is a partial cutaway diagram of a replaceable atmospheric vent filter 134 coupled to a process fluid pressure transmitter 100 in accordance with an embodiment of the present invention. Many aspects of the process fluid pressure transmitter illustrated in FIG. 2 are similar to that illustrated in FIG. 1, and like components are numbered similarly. Transmitter 100 includes an isolator diaphragm 114 that is configured to contact process fluid and deflect in such way as to convey process fluid pressure through measurement passageway 116 to pressure sensor 118. A second conduit 120 conveys atmospheric pressure to pressure sensor 118 such that the electrical indication provided by pressure sensor 118 is gage pressure of the process fluid. As illustrated in FIG. 2, electronics compartment 130 of transmitter 100 includes an internally threaded bore 132 that receives replaceable filter 134. Additionally, electronics compartment housing 130 includes an annular recess 136 within which an o-ring is placed such that housing 130 sealingly couples to base 112. Thus, the only path for atmospheric pressure to reach sensor 118 is through replaceable filter 134. Additionally, the provision of a seal with annular recess 136 helps reduce the amount of caustic chemicals or cleaning solution that can be potentially trapped within transmitter 100.

Figure 3:
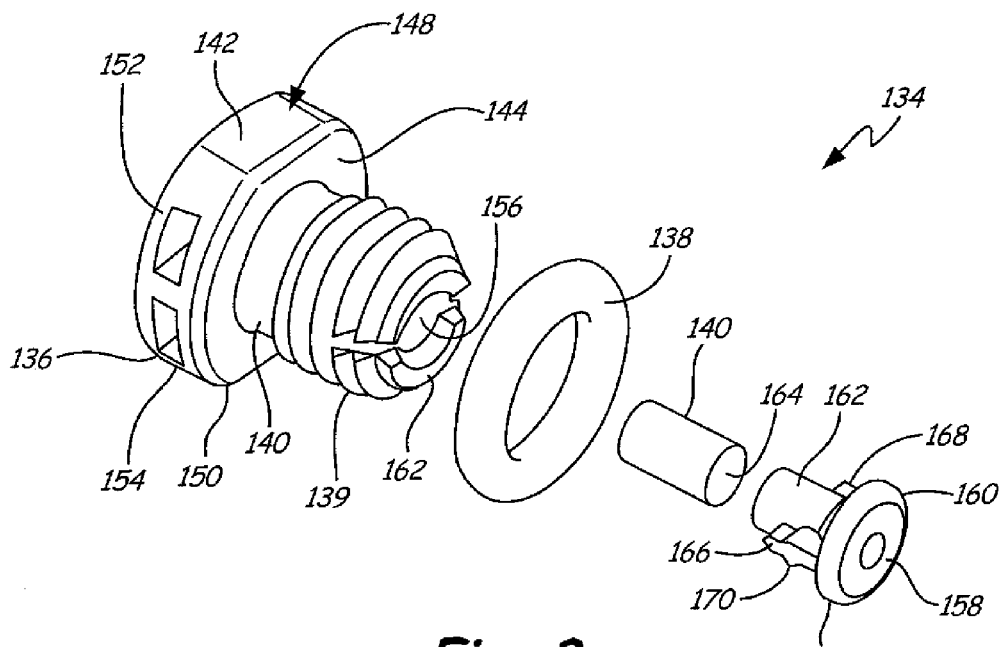
FIG. 3 is a perspective exploded view of a replaceable atmospheric vent filter in accordance with an embodiment of the present invention.

FIG. 3 is an exploded perspective view of replaceable atmospheric vent filter 134 in accordance with an embodiment of the present invention. Filter 134 is actually an assembly of four distinct elements. Specifically, filter 134 includes filter body 136, o-ring or elastomeric seal 138, filter element 140, and filter retainer 143.

Filter body 136 preferably includes an externally threaded region 139 that is configured to be threadably received within internally threaded bore 132 of the transmitter electronics housing 130. Filter body 136 also includes a non-threaded region 140 that is sized to receive and maintain o-ring 138.

Figure 4:
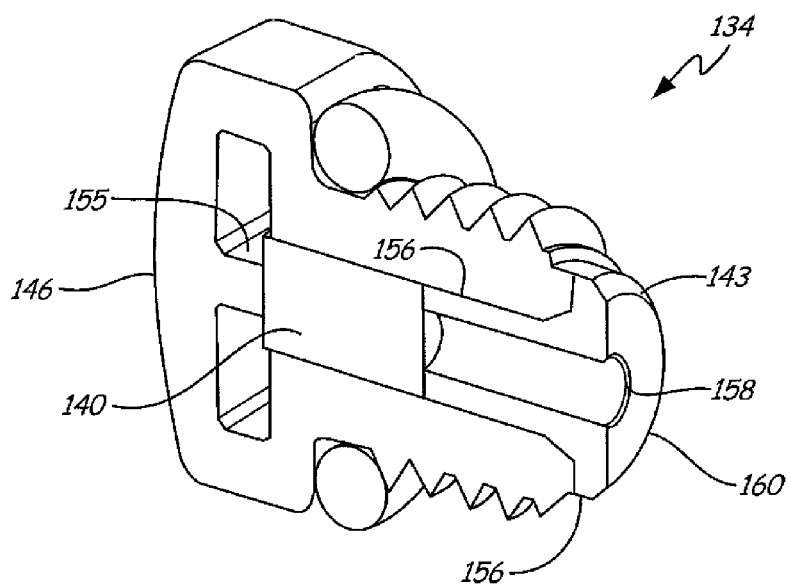
FIG. 4 is a cross sectional diagram of a replaceable atmospheric vent filter in accordance with an embodiment of the present invention.

Filter body 136 also includes a head 142 having a substantially flat surface 144 disposed to contact and bear against o-ring 138. Additionally, head 142 preferably also includes a slightly domed cap 146 (shown in FIG. 4). Filter body 136 is preferably configured to be engaged by a wrench or other suitable tool to be rotated or otherwise torqued into position within housing 130. In the embodiment illustrated in FIG. 3, this adaptation is in the form of a plurality of wrench flats 148, 150 disposed on opposite edges of a lateral sidewall of head 142. Head 142 also includes at least one vent passageway aperture that is in fluidic communication with the ambient environment. In the embodiment illustrated in FIG. 3, a pair of passageways 152, 154 are illustrated emerging from a lateral sidewall of head 142. However, this is merely a preferred embodiment, and other arrangements are contemplated. Filter body 136 has an axial bore 156 that is in fluidic communication with atmospheric vent passageways 152, 154, and that is sized to receive filter element 140. As illustrated in FIG. 4, the filter element 140 is preferably urged into contact with a support rib or beam 155 located within head 142. Filter element 140 can be any suitable element, but is preferably an element formed of polytetrafluoroethylene.

Filter retainer 143 includes an axial bore 158 that is in fluidic communication with atmospheric vent passageway 120, and in fluidic communication with filter element 140. Filter retainer 158 includes head 160 that engages surface 162 of filter body 136. Filter retainer 158 includes a cylindrical pusher 162 that is sized to pass within axial bore 156 of filter body 136. Pusher 162 acts against surface 164 of filter element 140 to push element 140 into contact with rib or support 155. Thus, pusher 162 can be used to essentially bear against surface 164 to such an extent that filter element 140 is compressed in its retained state. Filter retainer 143 includes a pair of locks or latches 166, 168 which each have a tab or bump 170 that is received by a cooperative recess within filter body 136. Filter body 136 will flex, or otherwise deform, as filter retainer 143 is inserted until locks 166, 168 slide into their fully-inserted position.

FIG. 4 is a cross sectional view of replaceable atmospheric filter 134 in a fully assembled configuration in accordance with an embodiment of the present invention. Filter retainer 143 is inserted into bore 156 to such an extent that head 160 bears against surface 156. Filter element 140 is compressed within axial bore 156 against support 155. Thus, air entering passageway 158 may pass through filter element 140 and out through passageways 152, 154, and vice versa. Thus, the atmospheric pressure is passed onto atmospheric measurement passageway 120, but particulate matter, and other debris is safely kept out of passageway 120.

Figure 5:
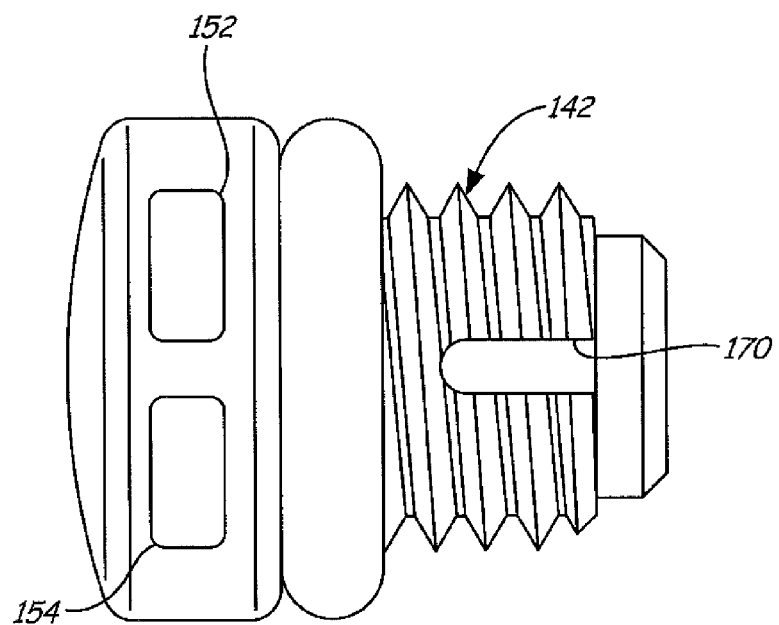
FIG. 5 is a side elevation view of a replaceable atmospheric vent filter in accordance with an embodiment of the present invention.

FIG. 5 is a diagrammatic elevation view, respectfully, of the assembled configuration illustrated in cross section in FIG. 4. Notably, FIG. 5 illustrates passageway 152, 154 as well as the cooperative slots 170 in filter body 142 that receive locks or latches 166, 168 of retainer 143.

Figure 6:
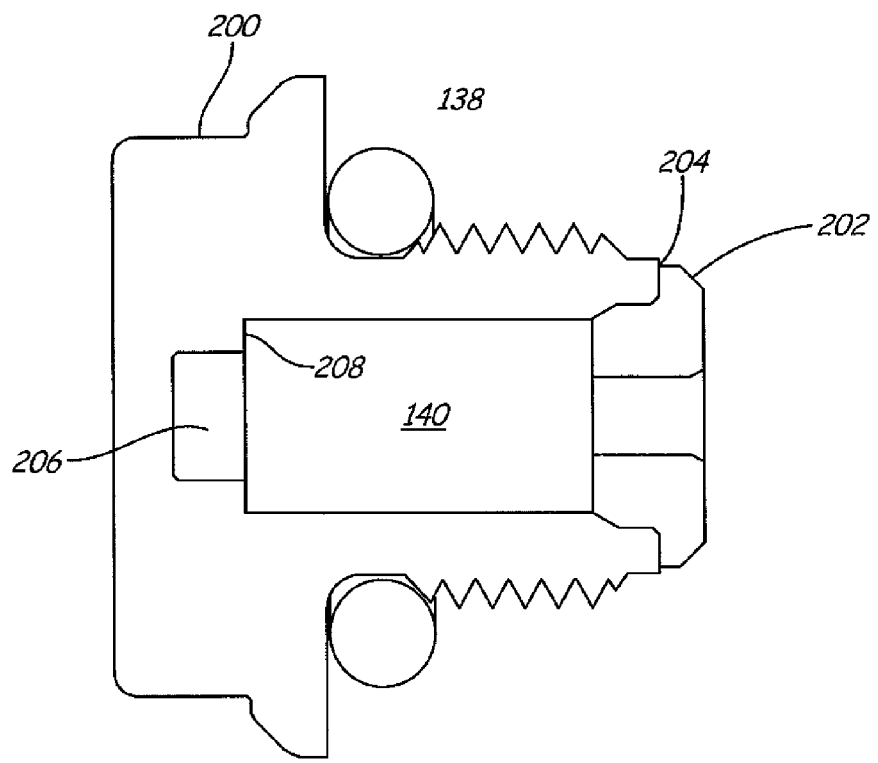
FIGS. 6 and 7 are side elevation cross-sectional and perspective cross-sectional views, respectively, of a replaceable atmospheric vent filter in accordance with another embodiment of the present invention.
Figure 7:
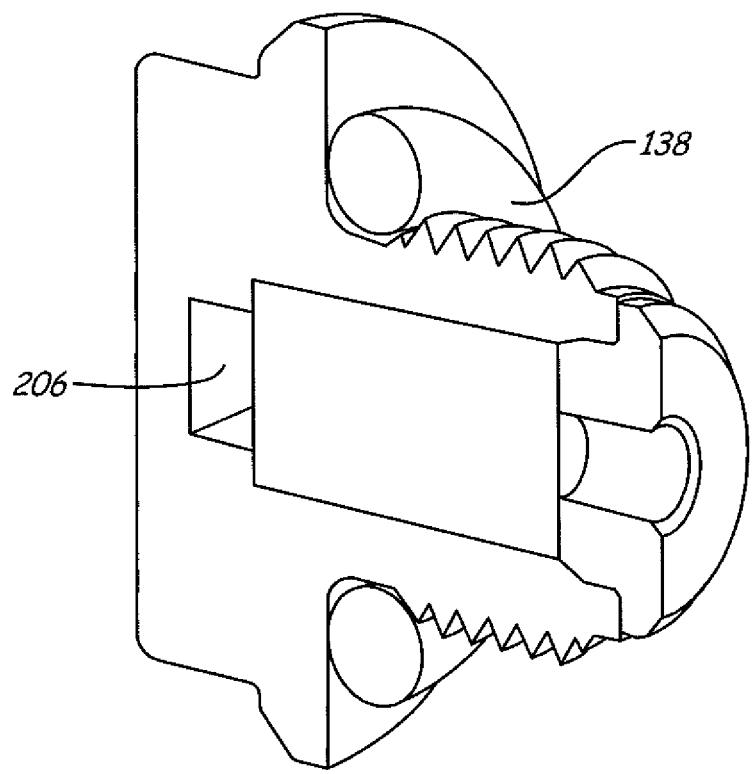

FIGS. 6 and 7 are side elevation cross-sectional and perspective cross-sectional views, respectively, of a replaceable atmospheric vent filter in accordance with another embodiment of the present invention. Filter body 200 cooperates with filter retainer 202 to maintain filter 140 therein. Unlike the embodiment described with respect to FIGS. 2-5, filter retainer 202 is simply affixed to end 204 of filter body, preferably using ultrasonic welding. However, any suitable fastening technique can be used. Another difference between the embodiment illustrated in FIGS. 6 and 7 and the embodiment illustrated in FIGS. 2-5 is that a single vent passageway 206 is provided. This is accomplished by providing a shoulder 208 in filter body 200 that has a diameter that is smaller than the diameter of filter 140. Thus, an end of filter 140 bears against shoulder 208 when filter 140 is maintained therein.

Figure 8:
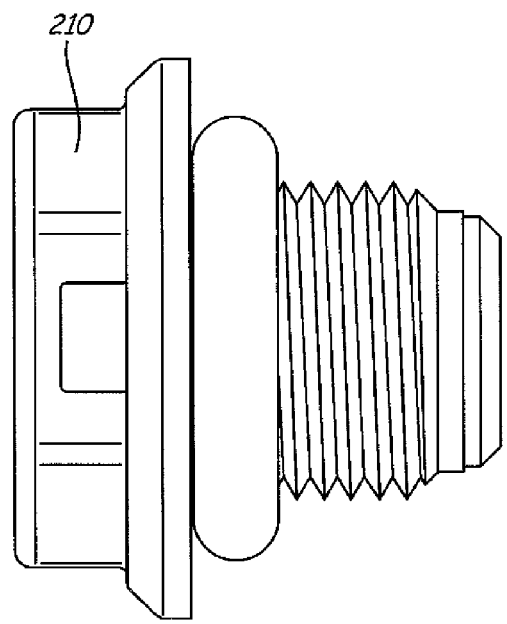
FIGS. 8 and 9 are side elevation and perspective views, respectively, of the replaceable atmospheric vent filter illustrated in FIGS. 7 and 8.
Figure 9:
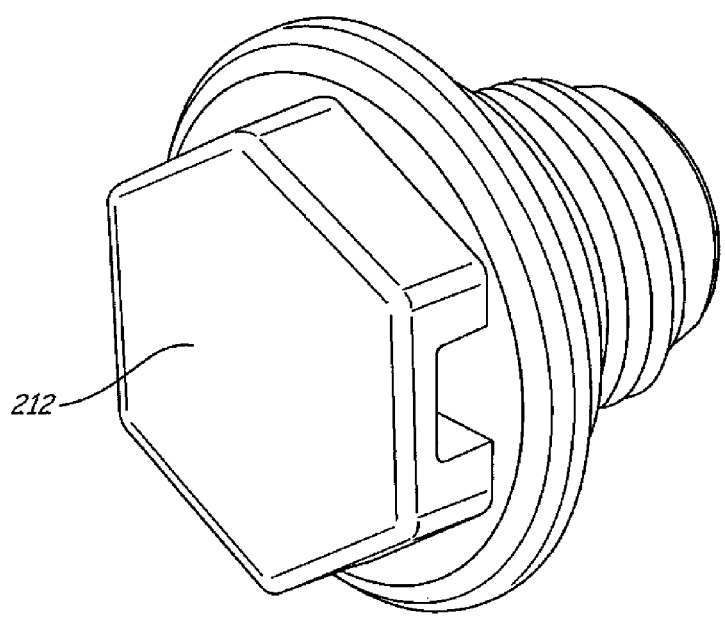

FIGS. 8 and 9 are side elevation and perspective views, respectively, of the replaceable atmospheric vent filter illustrated in FIGS. 6 and 7. FIGS. 8 and 9 show additional wrench flats in the form of a traditional hex head 210 that facilitates removal with a wrench or other suitable tool. Additionally, a label or other suitable indicia can be provided.

It is believed that embodiments of the present invention will provide a small, compact design that is relatively inexpensive to manufacture and easy to replace. Moreover, the replaceable atmospheric pressure vent can withstand high pressure cleaning, caustic solutions, and scrubbing. Embodiments of the present invention generally minimize water pressure on filter element 140 during cleaning, and it is noted that the filter element is protected from direct contact and is compressed and retained within bore 156. As illustrated in FIG. 3, it is preferred that filter retainer 143 simply snap into corresponding slots 170 to allow for a quick and easy assembly.

Although the present invention has been described with reference to preferred embodiments, workers skilled in the art will recognize that changes may be made in form and detail without departing from the spirit and scope of the invention.

What is claimed is:

1. A process fluid pressure transmitter for measuring a process pressure referenced to atmospheric pressure, the process fluid pressure transmitter comprising:
   a pressure sensor fluidically coupled to a pair of pressure conveying conduits, the pressure sensor having an electrical characteristic that varies with the pressures applied by the pressure conveying conduits;
   a process fluid inlet disposed to contact a process fluid, and being in fluidic communication with a first conduit of the pair of pressure conveying conduits;
   an atmospheric vent coupled to a second conduit of the pair of pressure conveying conduits, the atmospheric vent being replaceable and having a filter element disposed therein; and
   wherein the atmospheric vent includes a filter body that is configured to receive a filter element and maintain a first side of the filter element in fluidic communication with the second conduit, while a second side of the filter element is configured for exposure to an ambient environment;
   wherein the filter body includes at least one passageway operably interposed between the second side of the filter element and the ambient environment, wherein the at least one passageway includes at least one corner.

2. The process fluid pressure transmitter of claim 1, wherein the atmospheric vent is configured to be threadably received by a housing of the process fluid pressure transmitter.

3. The process fluid pressure transmitter of claim 2, wherein the housing is an electronics housing.

4. The process fluid pressure transmitter of claim 1, wherein the at least one corner is positioned to inhibit direct lines of sight between the ambient environment and the second side of the filter element.

5. The process fluid pressure transmitter of claim 1, wherein the corner is a right angle corner.

6. The process fluid pressure transmitter of claim 1, wherein the filter body Includes at least one rib configured to engage the second side of the filter element.

7. The process fluid pressure transmitter of claim 6, and further comprising a filter retainer configured to engage the first side of the filter element to lock the filter element within the filter body.

8. The process fluid pressure transmitter of claim 1, and further comprising a filter retainer configured to engage the filter element to lock the filter element within the filter body.

9. The process fluid pressure transmitter of claim 1, wherein the filter body includes a plurality of wrench flats.

10. The process fluid pressure transmitter of claim 1, wherein the filter body includes a non-threaded region configured to receive and maintain the elastomeric o-ring.

11. The process fluid pressure transmitter of claim 10, and further comprising an elastomeric o-ring disposed in the non-threaded region.

12. An replaceable atmospheric vent adapted to couple to a vent passageway of process fluid pressure transmitter, the atmospheric vent comprising:
   a filter element disposed therein; and
   a filter body configured to removably engage a housing of the process fluid pressure transmitter;
   wherein the filter body is configured to receive and maintain a first side of the filter element in fluidic communication with the vent passageway, while a second side of the filter element is configured for exposure to an ambient environment; and
   wherein the filter body includes at least one passageway operably interposed between the second side of the filter element and the ambient environment, wherein the at least one passageway includes at least one corner.

13. The replaceable atmospheric vent of claim 12, wherein the at least one corner is positioned to inhibit direct lines of sight between the ambient environment and the second side of the filter element.

14. The replaceable atmospheric vent of claim 12, and further comprising a filter retainer configured to engage the filter element to lock the filter element within the filter body.

15. The replaceable atmospheric vent of claim 12, wherein the filter body includes a plurality of wrench flats.

16. The replaceable atmospheric of claim 12, wherein the filter body includes a non-threaded region configured to receive and maintain an elastomeric o-ring.

* * * * *